(12) United States Patent
Chandel et al.

(10) Patent No.: US 12,052,468 B2
(45) Date of Patent: *Jul. 30, 2024

(54) TV MODE CHANGE IN ACCORDANCE WITH NUMBER OF VIEWERS PRESENT

(71) Applicant: Google LLC, Mountain View, CA (US)

(72) Inventors: Alok Chandel, Sunnyvale, CA (US); Eric H C Liu, Santa Clara, CA (US); Pierre-Yves Laligand, Palo Alto, CA (US); Justin Koh, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/130,146

(22) Filed: Apr. 3, 2023

(65) Prior Publication Data
US 2023/0239537 A1    Jul. 27, 2023

Related U.S. Application Data

(63) Continuation of application No. 17/306,146, filed on May 3, 2021, now Pat. No. 11,622,150, which is a
(Continued)

(51) Int. Cl.
*H04N 21/442* (2011.01)
*H04N 21/4415* (2011.01)
(Continued)

(52) U.S. Cl.
CPC ....... *H04N 21/443* (2013.01); *H04N 21/4415* (2013.01); *H04N 21/44218* (2013.01);
(Continued)

(58) Field of Classification Search
CPC ................................. H04N 21/44218
See application file for complete search history.

(56) References Cited

U.S. PATENT DOCUMENTS

| 7,131,132 B1 | 10/2006 | Gehlot et al. |
| 7,134,130 B1 | 11/2006 | Thomas |

(Continued)

OTHER PUBLICATIONS

Notice of Allowance dated Apr. 10, 2015 in U.S. Appl. No. 13/831,055.
(Continued)

*Primary Examiner* — Michael H Hong
(74) *Attorney, Agent, or Firm* — Brake Hughes Bellermann LLP

(57) ABSTRACT

This application is directed to changing a TV operating mode based on a potential relationship among viewers of a connected TV. In some implementations, a method includes: determining viewer identities and identifying the potential relationship among the viewers or a subset of the viewers; in accordance with a determination that the potential relationship allows the viewers to share private information, placing or maintaining the connected TV in or into a first operating mode that is unrelated to media content being displayed and allows personal information to be displayed on the connected TV; and in accordance with a determination that the potential relationship does not allow the viewers to share private information, placing or maintaining the connected TV in or into a second operating mode that is unrelated to the media content and does not allow personal information to be displayed on the connected TV.

21 Claims, 11 Drawing Sheets

Related U.S. Application Data continuation of application No. 16/680,876, filed on Nov. 12, 2019, now Pat. No. 10,999,628, which is a continuation of application No. 16/216,711, filed on Dec. 11, 2018, now Pat. No. 10,477,273, which is a continuation of application No. 15/948,895, filed on Apr. 9, 2018, now Pat. No. 10,154,311, which is a continuation of application No. 14/807,792, filed on Jul. 23, 2015, now Pat. No. 9,942,608, which is a continuation of application No. 13/831,055, filed on Mar. 14, 2013, now Pat. No. 9,100,694.

(51) Int. Cl.
| | |
|---|---|
| *H04N 21/443* | (2011.01) |
| *H04N 21/466* | (2011.01) |
| *H04N 21/475* | (2011.01) |
| *H04N 21/485* | (2011.01) |

(52) U.S. Cl.
CPC ..... *H04N 21/4661* (2013.01); *H04N 21/4751* (2013.01); *H04N 21/485* (2013.01)

(56) References Cited

U.S. PATENT DOCUMENTS

| | | | |
|---|---|---|---|
| 8,527,908 B2 * | 9/2013 | Pance | G06F 1/3231 |
| | | | 700/13 |
| 2003/0081834 A1 | 5/2003 | Philomin et al. | |
| 2003/0093784 A1 | 5/2003 | Dimitrova et al. | |
| 2005/0060738 A1 | 3/2005 | Stecyk | |
| 2006/0010470 A1 | 1/2006 | Kurosaki et al. | |
| 2007/0240180 A1 | 10/2007 | Shanks et al. | |
| 2008/0148184 A1 | 6/2008 | Davis | |
| 2008/0222671 A1 | 9/2008 | Lee et al. | |
| 2009/0023395 A1 | 1/2009 | Chang et al. | |
| 2009/0328127 A1 | 12/2009 | Barry et al. | |
| 2011/0242269 A1 | 10/2011 | Nothlings et al. | |
| 2012/0060176 A1 | 3/2012 | Chai et al. | |
| 2013/0160039 A1 | 6/2013 | Mentz et al. | |
| 2014/0223461 A1 | 8/2014 | Hatambeiki et al. | |
| 2014/0379456 A1 * | 12/2014 | Miller | G06Q 30/0247 |
| | | | 705/14.41 |

OTHER PUBLICATIONS

Notice of Allowance dated Jul. 11, 2019 in U.S. Appl. No. 16/216,711.
Notice of Allowance dated Sep. 20, 2018 in U.S. Appl. No. 15/948,895.
Notice of Allowance dated Nov. 16, 2022 in U.S. Appl. No. 17/306,146.
Notice of Allowance dated Dec. 18, 2017 in U.S. Appl. No. 14/807,792.
Notice of Allowance dated Dec. 30, 2020 in U.S. Appl. No. 16/680,876.
Office Action dated Apr. 27, 2022 in U.S. Appl. No. 17/306,146.
Office Action dated Apr. 29, 2014 in U.S. Appl. No. 13/831,055.
Office Action dated May 18, 2017 in U.S. Appl. No. 14/807,792.
Office Action dated Jul. 9, 2020 in U.S. Appl. No. 16/680,876.
Office Action dated Dec. 19, 2014 in U.S. Appl. No. 13/831,055.

* cited by examiner

Example privacy settings in personal mode

| Private information setting | Value |
|---|---|
| Text message | Display on TV = Yes |
| Incoming call | Display on TV = Yes |
| Instant message | Display on TV = Yes |
| Viewing history | Display on TV = Yes |
| Call history | Display on TV = Yes |
| Chat history | Display on TV = Yes |

Figure 2A

Example privacy settings in shared mode

| Private information setting | Value |
|---|---|
| Text message | Display on TV = No |
| Incoming call | Display on TV = No |
| Instant message | Display on TV = No |
| Viewing history | Display on TV = No |
| Call history | Display on TV = No |
| Chat history | Display on TV = No |

Figure 2B

Example privacy settings in party mode

| Private information setting | Value |
|---|---|
| Text message | Display on TV = No |
| Incoming call | Display on TV = No |
| Instant message | Display on TV = No |
| Viewing history | Display on TV = No |
| Call history | Display on TV = No |
| Chat history | Display on TV = No |
| Media content setting | Value |
| Public media content | Display on TV = Yes |
| Private media content | Display on TV = No |

Figure 2C

Example control settings in personal mode

| Control setting | Value |
|---|---|
| Voice control | Control enabled = Yes |
| Motion control | Control enabled = Yes |
| Keyboard control | Control enabled = Yes |
| Mouse control | Control enabled = Yes |
| Touchscreen control | Control enabled = Yes |
| Trackpad control | Control enabled = Yes |
| Control through multiple means | Control enabled = Yes |

Figure 3A

Example control settings in shared mode

| Control setting | Value |
|---|---|
| Voice control | Control enabled = Yes |
| Motion control | Control enabled = No |
| Keyboard control | Control enabled = Yes |
| Mouse control | Control enabled = Yes |
| Touchscreen control | Control enabled = Yes |
| Trackpad control | Control enabled = Yes |
| Control through multiple means | Control enabled = No |

Figure 3B

Example control settings in party mode

| Control setting | Value |
|---|---|
| Voice control | Control enabled = No |
| Motion control | Control enabled = No |
| Keyboard control | Control enabled = Yes |
| Mouse control | Control enabled = Yes |
| Touchscreen control | Control enabled = Yes |
| Trackpad control | Control enabled = Yes |
| Control through multiple means | Control enabled = No |

Figure 3C

TV MODE CHANGE IN ACCORDANCE WITH NUMBER OF VIEWERS PRESENT

CROSS-REFERENCE TO RELATED APPLICATIONS

This application is a continuation U.S. patent application Ser. No. 17/306,146, filed May 3, 2021, which is a continuation U.S. patent application Ser. No. 16/680,876, filed Nov. 12, 2019, which is a continuation of U.S. patent application Ser. No. 16/216,711, filed Dec. 11, 2018, which is a continuation of U.S. patent application Ser. No. 15/948,895, filed Apr. 9, 2018, which is a continuation of U.S. patent application Ser. No. 14/807,792, filed Jul. 23, 2015, which is a continuation of U.S. patent application Ser. No. 13/831,055, filed Mar. 14, 2013, each of which is incorporated by reference herein in its entirety.

TECHNICAL FIELD

The disclosed implementations relate generally to changing TV mode in accordance with number of viewers present.

BACKGROUND

Connected TVs, in addition to displaying conventional TV content, can display information from the Internet or home networks and/or information from second screen or portable devices, such as smart phones or tablet computers, which are paired with or locally networked with the TV. This multiplicity of connections enables viewers to access a range of media content and information (including personal information) from their TV. For example, while watching a TV program on a connected TV a viewer might also be able to access from the same TV social media posts and incoming email from his or her Internet accounts and text messages from his or her paired smart phone. While this integration is convenient for viewers, this situation also presents the challenge that it is not always ideal to provide all available information on the TV at all times. For example, while watching TV programs alone, a viewer might want to have his or her personal information e.g., incoming text messages) displayed on the TV, but this is not likely to be the case when he or she is viewing a sports event on the same TV with a group of friends. Therefore, it would be useful to have a convenient way of controlling what sorts of information is presented on a connected TV in accordance with a user's preferences.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 2A-2C are block diagrams illustrating example privacy settings in different operating modes, in accordance with some implementations.

FIGS. 3A-3C are block diagrams illustrating example control settings different operating modes, in accordance with some implementations.

SUMMARY

Figure 1A:
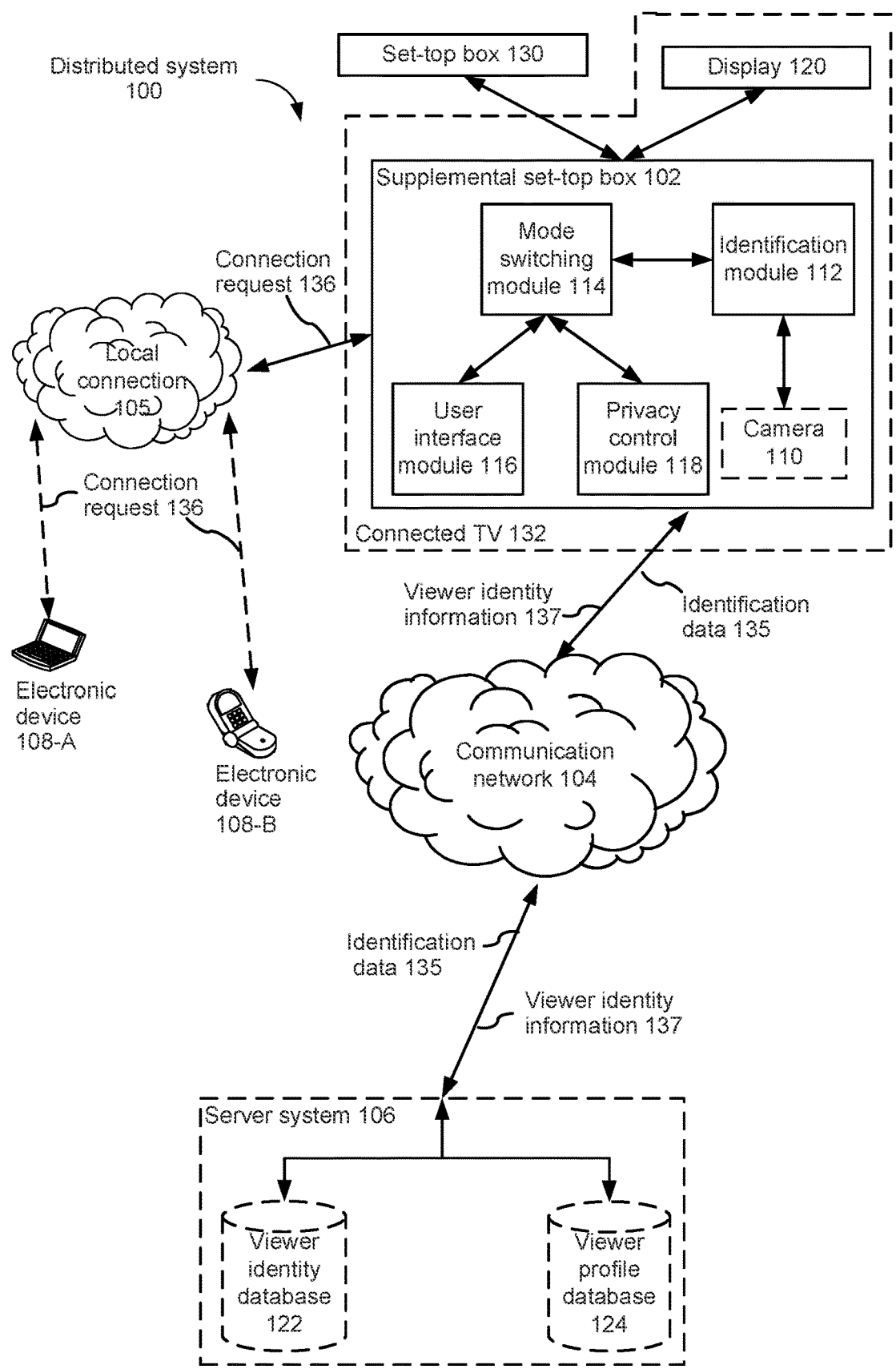
FIG. 1A is a block diagram illustrating a computer system, in accordance with some implementations.

Systems, methods, devices, and non-transitory computer readable storage mediums for changing TV mode in accordance with number of viewers present are hereby disclosed.

In some implementations, a method for changing TV mode in accordance with number of viewers present includes: at a supplemental set-top box, obtaining a total number of viewers of a connected TV, the connected TV having a plurality of operating modes, where the total number is one or more; in accordance with a determination that the total number of viewers is within a first predefined range of a plurality of predefined ranges; placing or maintaining the connected TV in or into a first operating mode unrelated to media content being displayed on the connected TV; and in accordance with a determination that the total number of viewers is within a second predefined range of the plurality of predefined ranges: placing or maintaining the connected TV in or into a second operating mode unrelated to the media content; wherein the second operating mode is different from the first operating mode.

In some implementations, the method further includes: determining identity of a first viewer of the connected TV; determining identity of a second viewer of the connected TV; determining a potential relationship between the first and second viewers based on the identities of the first and second viewers; and placing or maintaining the connected TV in or into a respective operating mode of the plurality of operating modes, in accordance with the potential relationship.

In some implementations, a respective operating mode of the plurality of operating modes is associated with different privacy settings.

In some implementations, obtaining a total number of viewers of the connected TV includes one of: (i) collecting facial or voice recognition data associated with the viewers; and determining the total number of viewers of the connected TV based on the facial or voice recognition data; (ii) collecting information identifying one or more consumer electronic devices associated with the viewers; and determining the total number of viewers of the connected TV based on the information identifying the consumer electronic devices; or (iii) collecting a user input indicating the total number of viewers of the connected TV.

In some implementations, the method further comprises: obtaining identities associated with the viewers of the connected TV by: (i) collecting facial or voice recognition data associated with the viewers; and comparing the collected facial or voice recognition data with a viewer identity database; or (n) collecting information identifying one or more consumer electronic devices associated with the viewers; and comparing the collected information with a device database; and placing or maintaining the connected TV in or into a respective operating mode of the plurality of operating modes, in accordance with the identities associated with the viewers.

In some implementations, the plurality of operating modes includes: a personal mode, a shared mode, and a party mode; and the plurality of predefined ranges includes: a predefined range for one viewer, a predefined range for a small group of viewers, and a predefined range for a large group of viewers.

In some implementations, the method also includes: placing or maintaining the connected TV in or into the personal mode when the total number of viewers is 1; placing or maintaining the connected TV in or into the shared mode when the total number of viewers is 2 to 3; or placing or maintaining the connected TV in or into the party mode when the total number of viewers is 4 or more.

In some implementations, in the personal mode, personal information received from an external source can displayed on the connected TV; in the shared mode, personal information received from an external source may not be displayed; and in the group mode, personal information received from an external source may not be displayed on the connected TV, and media content appropriate for a large group of viewers is displayed on the connected TV.

In some implementations, the media content appropriate for a large group of viewers is one of: a photo slideshow, an audio and video streaming, or a party game, and the personal information associated with a view is one of incoming or outgoing phone calls, text messages, instant messages, emails, or histories thereof. In some implementations, the media content appropriate for a large group of viewers includes media content associated with a group of viewers. In still other implementations, the media content appropriate for a large group of viewers includes public media content associated with an individual viewer.

In addition, a computer system (e.g., a server system) and a non-transitory computer readable storage medium storing one or more programs, which when executed by a computer, cause the computer to perform one or more steps of the above-described methods are also disclosed.

DETAILED DESCRIPTION

The implementations described herein provide techniques for changing or maintaining a TV operating mode in accordance with number of viewers present. For example, some implementations are configured to: (i) place the TV in a personal mode in which the viewer's private information (e.g., incoming emails or recent viewing history) is displayed on the TV when only one viewer is present (i.e., located in proximity to the TV); (ii) place the TV in a shared mode in which a viewer's private information is not displayed on the TV when two or three viewers are present; or (iii) place the TV in a party mode in which media content associated with one viewer (e.g., a YouTube video "liked" by that viewer) is displayed on the TV for sharing with other viewers when four or more viewers are present. Some implementations obtain how many viewers are present using one or more techniques, some of which are automated and some of which are manual. For example, automated techniques include sensing distinct bluetooth, wifi, mobile cellular radios, or NFC or RFID signals/tags in proximity to the TV or set top box connected to the TV. Manual techniques include allowing a viewer to input the number of viewers in the room on a remote control or a connected smart phone. These implementations may significantly enhance viewing experience for TV viewers, while still protect user privacy.

In some implementations, a supplemental set-top box (e.g., a Google TV-enabled device, or a set-top box with Internet connectivity) obtains a total number of viewers of a connected TV, where the connected TV is configured to display one or more of: conventional TV content, content or information provided via the Internet or a home network, and content or information from devices paired with the TV, such as smart phones and tablet computers.

In some implementations, in accordance with a determination that the total number of viewers is within a first predefined range (e.g., 1) of several predefined ranges, the electronic device places or maintains the connected TV in or into a first operating mode (e.g., a personal mode) unrelated to media content being displayed on the connected TV.

In some implementations, in accordance with a determination that the total number of viewers is within a second predefined range (e.g., 2 to 3, or 4 or more) of the several predefined ranges, the electronic device places or maintains the connected TV in or into a second operating mode (e.g., a shared mode or a party mode, respectively). The second operating mode is different from the first operating mode. In some implementations, the operating mode is based solely on the number of viewers present and is unrelated to any aspect of the media content (e.g., an audience suitability rating associated with the content).

In some implementations, when the TV is in the personal mode, personal information (e.g., incoming emails or instant messages) received from an external source (e.g., a viewer's smart phone or laptop) can be displayed on the connected TV. In some implementations, when the TV is in the shared mode, personal information received from an external source is not displayed, so as to protect viewer privacy. In some implementations, when the TV is in the group mode, personal information received from an external source is not be displayed on the connected TV, but media content appropriate for a large group of viewers (e.g., party music or music videos) is displayed on the connected TV.

In this way, a TV's operating mode and associated privacy settings are automatically adjusted or maintained, without viewer intervention, based on the number of viewers present. This approach is beneficial as it enhances the viewing experience while still protecting user privacy. For example, when acquaintances arrived unannounced, a user need not scramble through multiple levels of TV menus to prevent detailed viewing history or sensitive emails from being displayed on his or her TV.

Additional details of implementations are now described in relation to the Figures.

FIG. 1 is a block diagram illustrating a computer system 100 for changing or maintaining a TV operating mode in accordance with number of viewers present. In some implementations, the computer system 100 includes a display (or a TV) 120, a set-top box 130, a supplemental set-top box ("supplemental STB") 102, (e.g., a Google TV-enabled device, a set-top box connected to either the TV or the Google-TV enabled device, or a combination of the above), a communication network 104, optionally a server system 106 ("server 106"), and optionally one or more consumer electronic devices 108 ("electronic device 108"; e.g., electronic devices 108-A and 108-B), one or more of which is paired with the TV. In some implementations, the combination of the display 120 and the supplemental STB 102 is called a connected TV 132. In some implementations, the supplemental STB 102 is integrated as part of the display or TV 120.

In some implementations, the supplemental STB 102 includes a camera 110, an identification module 112, a mode switching module 114, a user interface module 116, and a privacy control module 118. In some implementations, the camera 110 is configured to capture automatically (e.g., without a user command to initiate the operation) facial or voice recognition data, or simply images, of one or more viewers present (e.g., viewers within a predefined distance from or a predefined angle in relation to the TV). In some implementations, the identification module 112 identifies a total number of viewers present and optionally identifies of these viewers, in accordance with, for example, the facial or voice recognition data generated by the camera 110. In some implementations, the mode switching module 114, based on the total of number of viewers, and optionally on the identities of these viewers, places or maintains the connected TV in one of a plurality of predefined operating modes. In some implementations, the user interface module 116, based on the operating mode in which a connected TV is, displays different user interface controls (e.g., an email application for displaying email content, a media player for displaying photos or videos or a text window for displaying texts sent to and from a paired smart phone). In some implementations, the privacy control module 118 applies different privacy settings to the connected TV in accordance with the operating mode of the connected TV. In some implementations, the privacy control module 118 also applies different privacy settings to viewer personal information transferred from an external device (e.g., emails received on a smart phone) to the connected TV, or information stored on the connected TV (e.g., a viewer's recent viewing history).

In some implementations, the supplemental STB 102 is connected with a set-top box 130 using an HDMI connection (e.g., an HDMI cable). In some implementations, the set-top box 130 receives media content from a content provider, via a cable network or a satellite network.

In some implementations, the display 120 (e.g., a computer monitor or a conventional TV) displays media content (e.g., TV programming or a viewer's favorite YouTube videos), and optionally a viewer's personal information (e.g., a portion of an incoming email).

In some implementations, the supplemental STB 102 sends identification data 135 (e.g., facial recognition data generated by the camera 110) to the server 106, and receives user identity information 137 from the server 106. In some implementations, the supplemental STB 102 also receives connection requests 136 from one or more electronic devices 108 (e.g., a laptop or a smart phone), via a local connection 105, and in responses to the connection requests 136, establishes connections with one or more of the electronic devices 108. In some implementations, sending of any user identification information to the server is strictly subject to explicit user permission. For example, a user must affirmatively specify that she permits information identifying her location, viewing history, or home address to be sent to the server 106 by turning on (e.g., checking on) one or more privacy settings.

In some implementations, the communication network 104 optionally includes the Internet, one or more local area networks (LANs), one or more wide area networks (WANs), other types of networks, or a combination of such networks.

In some implementations, the local connection 105 optionally includes the one or more local area networks (wired or wireless), bluetooth, radio-frequency connections, serial or parallel cable connections, other types of connections, or a combination of such connections.

In some implementations, the server 106 includes a viewer identity database and a viewer profile database 124. In some implementations, the viewer identity database 122 includes information concerning viewer identifies (e.g., a viewer's name, photos, and optionally relationship with another viewer), and the viewer profile database 124 includes one or more viewer profiles. In some implementations, a viewer profile includes a viewer's viewing history (e.g., what movies a viewer has watched in the past 48 hours), or viewing preference (e.g., a favorite type of movie). In some implementations, a view profiles also includes a group profile identifying view histories or preferences of a group of viewers (e.g., viewers associated with a common social group or viewers within a same social circle). In some implementations, to balance processing work load with the supplemental STB 102, the server 106 optionally includes the identification module 112, the mode switching module 114, the user interface module 116, and the privacy control module 118.

In some implementations, the server 106 receives the identification data 135 from the supplemental STB 102, identifies one or more viewers based on the identification data 135 and data stored in the viewer identity database 122, and transmits the user identity information 137 back to the supplemental STB 102.

In some implementations, the electronic device 108 is a smart phone (e.g., an android phone), a laptop, a desktop, or an intelligent home appliance (e.g., an intelligent refrigerator). In some implementations, the electronic device 108 is external to the supplemental STB 102 and connects with the supplemental STB 102 via the local connection 105. In some implementations, the electronic device 108 establishes a connection with the supplemental STB 102 by sending a connection request 136 to the supplemental STB 102. In some implementations, the connection request 136 includes authentication information (e.g., a device ID and corresponding password) that enables the electronic device 108 to be connected to the supplemental STB 102.

Figure 1B:
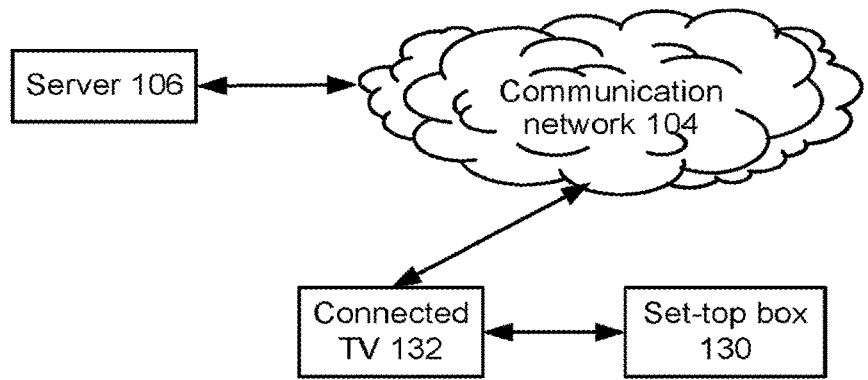
FIGS. 1B-1D are block diagrams illustrating example configurations of a computer system for changing device operating mode in accordance with number of viewers present.
Figure 1C:
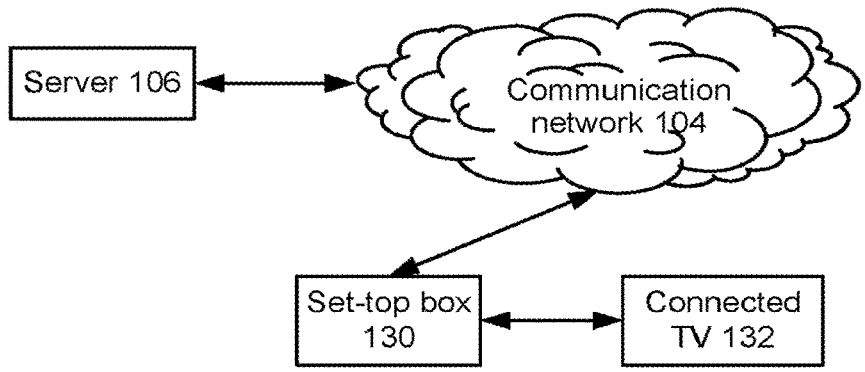
Figure 1D:
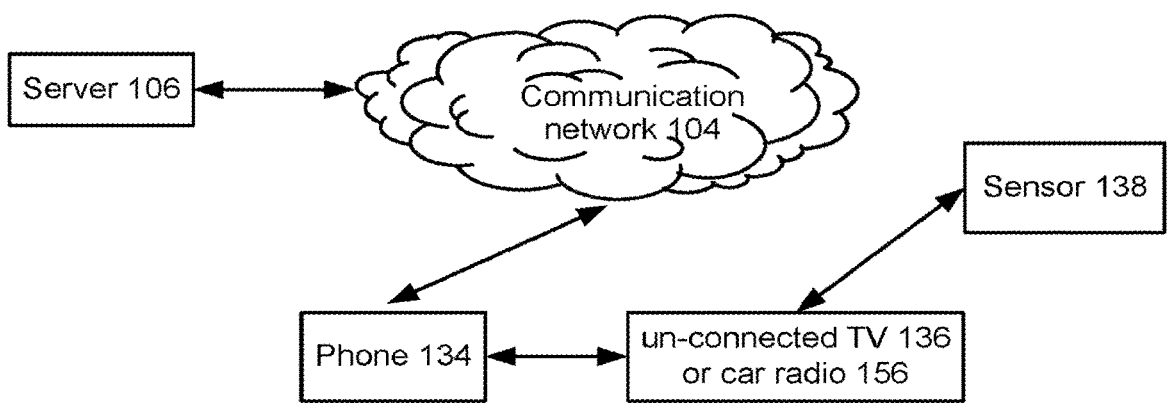

FIGS. 1B-1D are block diagrams illustrating example configurations of a computer system for changing device operating mode in accordance with number of audience present.

A shown in FIG. 1B, in some implementations, the connected TV 132 is connected to both a set-top box 130, and a server 106 via the communication network 104. As noted above, in some implementations, the connected TV 132 includes both a display 120 or a TV, and the supplemental STB 102. In some implementations, the connected TV 132 obtains a total number of viewers who are present (e.g., using a camera or microphone), and switches or maintains, without human intervention, into or in a particular operating made in accordance with the total number of viewers. Personal or private information received from the set-top box 130 (e.g., TV programming promotion based on past viewing history) is displayed or hidden from display on the connected TV 132, based on an operating mode in which the connected TV is in. In some implementations, the server 106 provides viewer identity data or media content (e.g., YouTube videos) for display on the connected TV 132.

A shown in FIG. 1C, in some implementations, the connected TV 132 is connected with the set-top box 130 (e.g., via an HDMI cable), which is in turn connected with a server 106 (e.g., via the communication network 104). In some implementations, the supplemental STB 102 included in the connected TV 132 obtains a total number of viewers who are present (e.g., using a camera or microphone), and switches or maintains, without human intervention, the connected TV 132 into or in a particular operating mode in accordance with the total number of viewers. In some implementations, personal or private information received from the server 106 (e.g., personal emails, or TV programming promotions based on past viewing history) is displayed or hidden from display on the connected TV 132, based on an operating mode in which the connected TV 132 is in. In some implementations, the server 106 provides viewer identity data or media content (e.g., YouTube videos) for display on the connected TV 132

As shown in FIG. 1D, in some implementations, modules included in the supplemental STB 102 (e.g., the camera 110, the identification module 112, the mode switching module 114, the user interface module 116, and the privacy control module 118) are built into a phone 134. In some implementations, the phone 134 is connected with a car radio 156 or an un-connected TV 136, with a sensor 138 (e.g., a weight sensor), and with a server 106 (e.g., via the communication network 104). In some implementations, the phone 134 (e.g., a smart phone) obtains a total number of passengers in a car from the sensor 138 or from the camera 110. For example, based on how much weight is placed or a manner in which weight is placed on a car seat, the sensor 138 determines whether a passage is sitting on a car seat, and then the total number passengers present in a car. For another example, based on images taken by the camera 110, the phone 134 determines whether a passage is sitting on a car seat, and then the total number passengers present in a car. Based on the total number of passengers in the car, the phone 134 places or maintains the car radio or the un-connected TV (e.g., a portable TV in a car) 136 into or in a particular operating mode. For example, when 4 passengers are present in the car, the phone 134 places the car radio 136 into a party mode (e.g., plays hip-hop music at the car radio). For another example, when only 1 passenger is present in the car, the phone 134 places the car radio 136 into a personal mode (e.g., plays light music at the car radio). In some implementations, the server 106 provides media content (e.g., music or YouTube videos) for play on the car radio or the un-connected TV 136.

Figure 2:
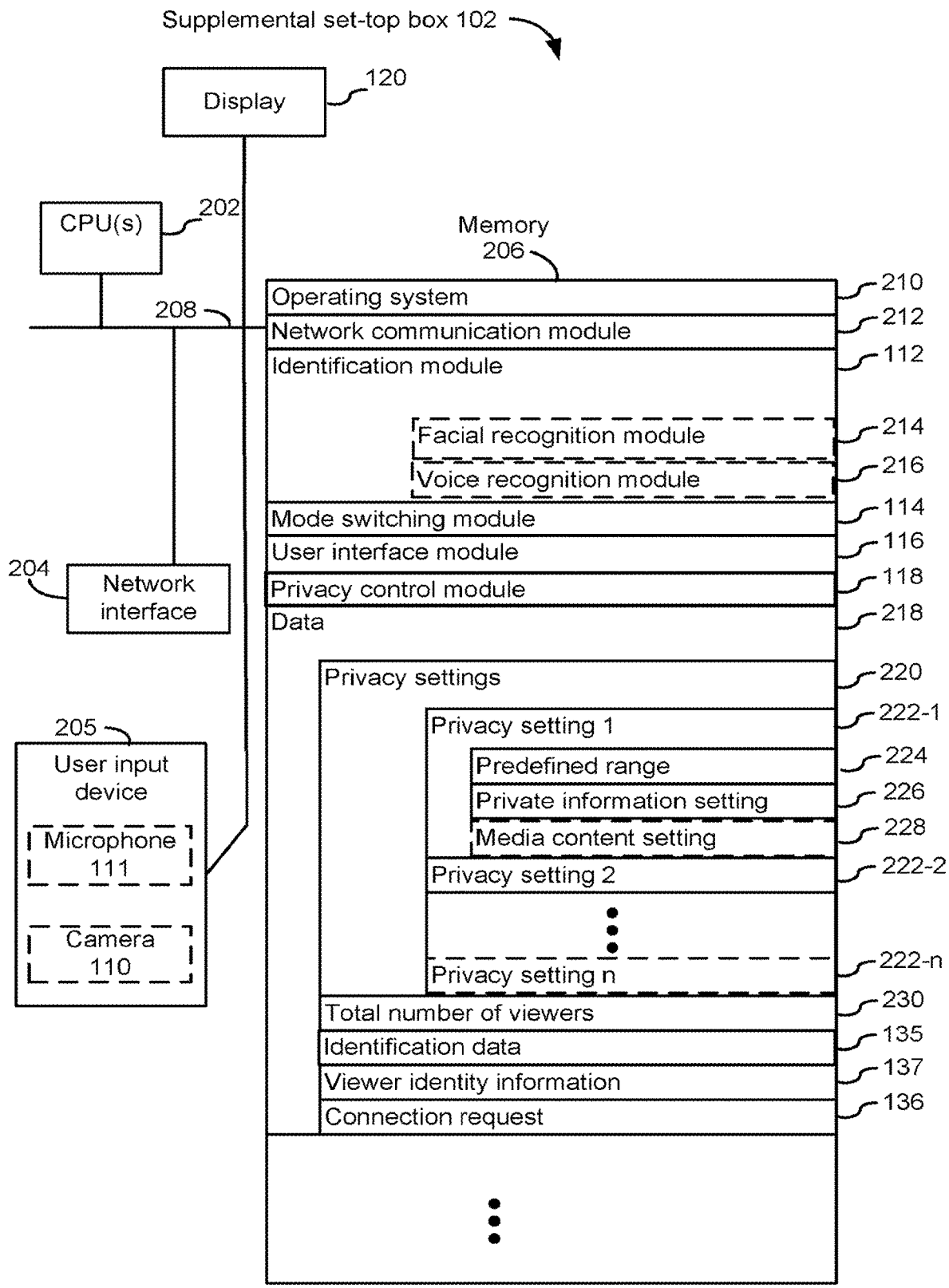
FIG. 2 is a block diagram illustrating an example supplemental set-top box, in accordance with some implementations.

FIG. 2 is a block diagram illustrating a supplemental set-top box 102 ("supplemental STB 102") in accordance with some implementations. The supplemental STB 102, in some implementations, includes one or more processing units CPU(s) 202 (also herein referred to as processors, one or more network interfaces 204, one or more user input devices 205, memory 206, the display 120, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the supplemental STB 102 with other devices (e.g., the server 106 or the electronic device 108-A) via one or more network interfaces 204 (wired or wireless), or the communication network 104 (FIG. 1);
- an identification module 112 for identifying a total number of viewers present and optionally identifies of these viewers, which includes:
  - a facial recognition module 214 for collecting facial recognition data (e.g., generated by the camera 110) of TV viewers (who are present); and
  - a voice recognition module 214 for collecting voice recognition data (e.g., generated by a microphone) of TV viewers;
- a mode switching module 114 for placing or maintaining the connected TV or the display in or into a predefined operating mode, based on the total number of viewers present and optionally identifies of these viewers;
- a user interface module 116 for displaying different user interface control (displaying or hiding incoming email content) in accordance with a particular operating mode of the connected TV;
- a privacy control module 118 for applying different privacy settings to information transferred to (e.g., incoming entails) or stored on (e.g., viewing histories) the connected TV, in accordance with a particular operating mode of the connected TV;
- data 218 stored on the supplemental STB 102, which include:
  - privacy settings 220, which include:
    - privacy setting 1 (222-1) associated with a first operating mode of the connected TV, which includes:
      - a predefined range 224 (e.g., 1 or a single viewer) for the total number of viewers;
      - a private information setting 226 for displaying or hiding viewer private information (e.g., incoming emails or viewing history) on the connected TV; and
      - optionally a media content setting 228 for displaying or hiding viewer media content associated with a viewer (e.g., a YouTube video "liked" by a viewer) on the connected TV;
    - privacy setting 2 (222-2) associated with a second operating mode of the connected TV; and
    - optionally privacy setting n (222-n) associated with a n-th operating mode of the connected TV;
  - a total number of viewers 230 (e.g., the total timber of viewers with in a predefined distance from the connected TV or viewers within a predefined angle to the connected TV);
  - identification data 135 for including data relevant to user identities (e.g., facial or voice recognition data);
  - viewer identity information 137 for including identities of one or more viewers (e.g., viewer names), and optionally an existing relationship between two viewers (e.g., viewer 1 is the girlfriend of viewer 2); and connection request 136 for including one or more requests (received from electronic devices 108) to connect with the supplemental STB 102, and authentication data (e.g., device ID or password) associated with these requests.

In some implementations, the one or more user input devices 205 include the camera 110, and the microphone 111. In some implementations, the camera 110 collects image data (e.g., relating to one or more viewers and to surrounding environment). In some implementations, the image data of the viewers include viewer expressions (e.g., facial and body), viewer movements or gestures (e.g., eye and body movements), such as, looking up at the ceiling, looking down at the floor, looking sideways at an object other then the connected TV (all of which may be indicative of a lack of, or diminished, user interest in the media content being displayed on the connected TV), looking straight at the connected TV (which may be indicative of a strong user interest), waving left hand, nodding the head, stretching arms/legs, combing hairs, standing up, laying down in a couch, and sitting up tight in a chair. In some implementations, the image data of the surrounding environment include viewer location (e.g., in a kitchen area, in a bedroom, in a living room, and in a supermarket) or TV location (e.g., at a public airport, a bus station, a train station, or a private residence). In some implementations, the image data are used to determine the total number of viewers present, e.g., using factual recognition techniques.

In some implementations, viewer movement (e.g., eye movement) or gestures are tracked (e.g., for purpose of controlling the connected TV or otherwise), only when expressly authorized by the viewers. For example, a viewer must first read a comprehensive disclosure on movement tracking (e.g., a user agreement) and specifically agree to be tracked, before motion or voice control functionality can be enabled on the supplemental STB 102.

In some implementations, the microphone 111 collects voice data (e.g., relating to one or more viewers and to surrounding environment). In some implementations, the voice data of the viewers include characters, words, phrases, and sentences uttered (e.g., spoken) by the viewers, or a portion thereof. In some implementations, the voice data also include a tone or a manner in which the characters, words, phrases, and sentences are uttered or spoken (e.g., with anger or with joy, with urgency or with ease). In some implementations, the voice data are used to determine the total number of viewers present, e.g., using voice recognition techniques.

In some implementations, the supplemental STB 102 also includes one or more media content inputs/outputs, and a TV remote control. In some implementations, the TV remote control adjusts (e.g., fast-forward or -backward) media content being displayed on the connected TV 132. In some implementations, the display 120 includes a TV screen or a computer monitor.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

FIGS. 2A-2C are block diagrams illustrating example privacy settings in different operating modes, in accordance with some implementations.

FIG. 2A shows example privacy settings when a connected TV is in the personal mode (e.g., when only 1 viewer is present), in accordance with some implementations. As shown in FIG. 2A, the privacy settings include private information settings for different categories of private information, and values corresponding thereto (250). As shown in FIG. 2A, in some implementations, when the connected TV is in the personal mode, incoming or outgoing text messages are displayed on the connected TV (252), incoming or outgoing phone calls to a viewer's smart phone or interact calls (e.g., Google voice calls) are displayed on the connected TV (254). So are instant messages (e.g., received on a smart phone or a laptop connected to the connected TV) (254). In addition, the viewer's viewing history (e.g., what movies or TV programs the viewer has watched in the past week) is displayed on the connected TV (258), and the viewer's call history (260) and chat history (262) are also displayed. This approach may be beneficial, because it allows, when a viewer is alone by him- or herself, a viewer's private information to be conveniently displayed on a TV, which usually has more display real estate (e.g., larger screen). The viewer can glance over or review incoming entails while watching a favorite TV episode, without having to constantly check emails on a phone or laptop. Viewing experience may thus be improved.

FIG. 2B shows example privacy settings when the connected TV is in the shared mode (e.g., when 2 to 3 viewers are present), in accordance with some implementations. As shown in FIG. 2B, in some implementations, when the connected TV is in the shared mode, incoming or outgoing text messages (254) are not displayed on the connected TV (e.g., only displayed on the viewer's individual smart phone), to protect viewer privacy. In some implementation, nor are incoming or outgoing phone calls (254), instant messages (256), a viewer's viewing history (258), call history (260), and chat history (262). In some implementations, when in the shared mode, information that may be considered private or sensitive to a viewer (e.g., call history, chat history or viewing history) are not displayed or hidden from display on the connected TV so as to protect viewer privacy.

FIG. 2C shows example privacy settings when the connected TV is in the party mode (e.g., 4 or more viewers are present), in accordance with some implementations. As shown in FIG. 2C, in some implementations, when the connected TV is in the shared mode (e.g., 4 or more viewers are present), incoming or outgoing text messages (254), phone calls (254), instant messages (256), a viewer's viewing history (258), call history (260), and chat history (262) are not displayed (or are hidden from display) on the connected TV.

As also shown in FIG. 2C, in some implementations, the privacy settings include private information settings (250), and media content settings (264). In some implementations, in the party mode, the media content settings (264) includes settings for public media content (e.g., photos or video a viewer has shared with other viewers, such as public photos stored on Google Picasa), and settings for private media content (e.g., video a viewer has chosen not to share with other viewers). In some implementations, in the party mode, public media content (266) is displayed on the connected TV, but private media content (268) is not displayed (or is hidden from display) on the connected TV.

In some implementations, a predefined operating mode is associated with default privacy settings. For example, privacy settings shown in FIG. 2B are default settings under the shared mode. In some implementations, default privacy settings can be overridden by user entered values.

Figure 3:
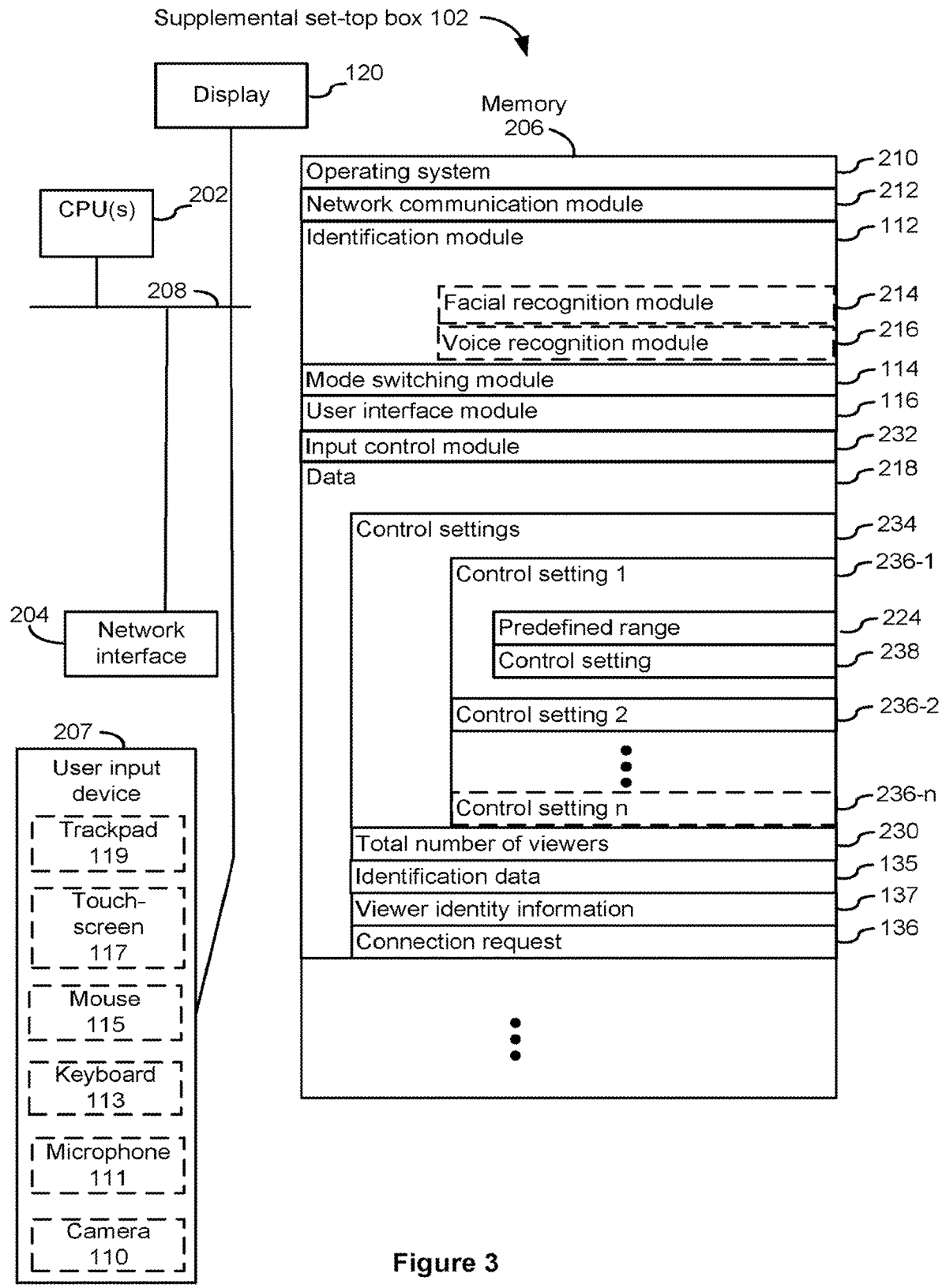
FIG. 3 is a block diagram illustrating another example supplemental set-top box, in accordance with some implementations.

FIG. 3 is a block diagram illustrating another example supplemental STB 102 A, in accordance with some implementations. The supplemental STB 102 has similar components to those described with reference to FIG. 2. In some implementations, the memory 206 or alternatively, the non-transitory computer readable storage medium 206, stores programs similar to those described with reference to FIG. 2, as well as the following programs, modules and data structures, or a subset thereof:

- a user interface module 116 for displaying different user interface controls (e.g., a virtual keyboard or user selectable on-screen icons) and receiving and outputting user interface commands and feedback between one or more viewers and respective user interface devices 207;
- an input control module 232 for applying different control settings to the one or more user input devices 207, including enabling and disabling the use of different types of user input devices 207, in accordance with a particular operating mode of the connected TV;
- data 218 stored on the supplemental STB 102, which include:
    - control settings 234, which include:
        - control setting 1 (222-1) associated with a first operating mode of the connected TV, which includes:
            - a predefined range 224 (e.g., 1 or a single viewer) for the total number of viewers; and
            - a control setting 238 for controlling user input (via the one or more user input devices 207) to the connected TV;
        - control setting 2 (222-2) associated with a second operating mode of the connected TV; and
        - optionally control setting n (222-n) associated with a n-th operating mode of the connected TV;

In some implementations, the one or more user input devices 207 include the camera 110, the microphone 111, a keyboard 113, a mouse 115, a touchscreen 117, and a trackpad 119.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

FIGS. 3A-3C are block diagrams illustrating example control settings in different operating modes, in accordance with some implementations.

Figure 3D:
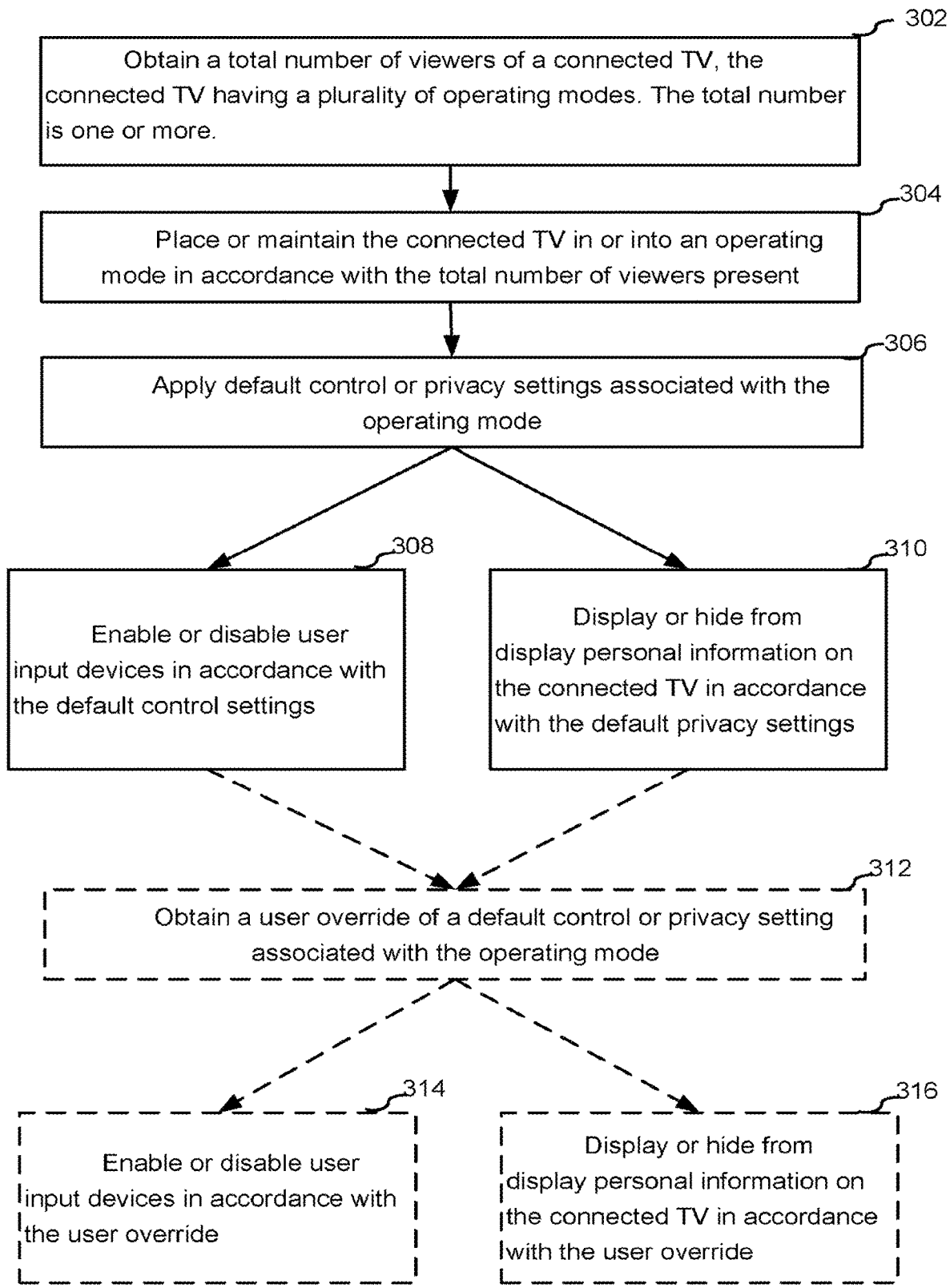
FIG. 3D is a flow chart illustrating a method for applying and overrding default control or privacy settings, in accordance with some implementations.

As shown in FIG. 3D, in some implementations, a connected TV or a supplemental STB connoted thereto obtains (302) a total number of viewers of the connected TV. After obtaining the total number of viewers, the supplemental STB places or maintains (304) the connected TV in or into an operating mode in accordance with the total number of viewer present.

In some implementations, the input control settings 234 are initially set to default values that are generally effective for the available TV operating modes. For example, while voice input is effective in personal (i.e., one person) mode, voice input is generally not useful in multi-user mode (i.e., when a large number of users are in proximity to the TV being controlled). For this reason, in some implementations, the default settings for personal mode and multi-user mode respectively allow and exclude voice commands.

In some implementations, the supplemental STB applies (306) default control or privacy settings (e.g., default values) associated with the operating mode.

In some implementations, the supplemental STB enables or disables (308) a user input device in accordance with the default control settings associated with the operating mode (e.g., enabling or disabling voice control as a means to control the connected TV). In some implementations, the supplemental STB displays or hides (310) from display personal information on the connected TV in accordance with the default privacy settings associated with the operating mode.

In some implementations, the default input control setting values can be modified by a primary registered viewer (e.g., to allow a large group to play a party game that requires voice input), subject to privacy concerns. In some implementations, moving between the different settings and enabling and disabling the associated user interface devices are performed under control of the input control module.

In some implementations, the supplemental STB obtains (312) a user override of a default control or privacy setting (e.g., a default value) associated with the operating mode. For example, a user would like to turn on voice control when there are 5 viewers present, even if by default, in the group mode, voice control is not enabled.

In some implementations, where the user overrides a default control setting, the supplemental STB enables or disables (314) a user input in accordance with the user override (e.g., enabling or disabling voice control as a means to control the connected TV). In some implementations, where the user overrides a default privacy setting, the supplemental STB displays or hides (316) from display personal information on the connected TV in accordance with the user override.

FIG. 3A shows example control settings when a connected TV is in the personal mode (e.g., when only 1 viewer is present), in accordance with some implementations. As shown in FIG. 3A, the control settings include settings for different means of controlling the connection TV, and values corresponding thereto (580). As shown in FIG. 3A, in some implementations, under control of the input control module 232, when the connected TV is in the personal mode, voice control (e.g., via hot words or key words) of the connected TV is enabled (282), motion control (e.g., gesture and eye movement) of the connected TV is enabled (284). So are the mouse control (286), the keyboard control (e.g., wired or wireless) (288), the touchscreen control (290), and the trackpad control (292) enabled. In addition, the control of the connected TV through multiple means is also enabled (294). In some implementations, control through multiple means includes user control of the connected TV via two or more of the above identified means, such as (i) concurrent control of the connected TV, using voice control (via the microphone 111 in FIG. 3), and keyboard control (via the keyboard 113 in FIG. 2); and (ii) concurrent control of the connected TV, using voice control (via the camera 110 in FIG. 3, which is equipped with audio recognition capacity), and motion control (via the same camera 110 in FIG. 3).

This approach allows a viewer, when alone, several ways to conveniently control the connected TV. For example, when the viewer is preparing a late night dinner in her kitchen away from a mouse or a keyboard, because voice control is enabled, the viewer can still switch to a different TV channel using voice commands; e.g., by speaking, to the general direction of the connect TV 132 or the microphone 111, at appropriate volume, "go to Law and Order," or "play radio station NPR" in some implementations, a connected TV or a supplemental STB determines an operating mode in accordance with the total number of viewers present, and loads control settings (e.g., settings 282-294 in FIGS. 3A-3C) automatically, without user intervention in accordance therewith.

FIG. 3B shows example control settings when the connected TV is in the shared mode (e.g., when 2 to 3 viewers are present), in accordance with some implementations. As shown in FIG. 3B, when the connected TV is in the shared mode (e.g., when 2 to 3 viewers are present, inclusive), voice control (e.g., via hot words or key words) of the connected TV is enabled (282). So are the mouse control (286), the keyboard control (e.g., wired or wireless) (288), the touchscreen control (290), and the trackpad control (292) enabled. In some implementations, the motion control (e.g., gesture and eye movement) of the connected TV, however, is not enabled (e.g., disabled) (284). In addition, in some implementations, the control through multiple means is also not enabled (e.g., disabled) (294).

FIG. 3C shows example control settings when the connected TV is in the party mode (e.g., 4 or more viewers are present), in accordance with some implementations. As shown in FIG. 3C in some implementations, when the connected TV is in the shared mode (e.g., 4 or more viewers are present), the voice control (282), the motion control (284), and the control through multiple means (294) are not enabled, because e.g., it may be difficult to detect voice or motion control commands from 4 or more viewers simultaneously, due to an increased likelihood of voice motion overlap. In some implementations, the mouse control (286), the keyboard control (288), the touchscreen control (290), and the trackpad control (292) are enabled.

In some implementations, a user input device is partially enabled or disabled in accordance with an operating mode. In some implementations, in the group mode, voice or motion control of the connected TV is partially enabled, disabled, or modified. For example, when switching a connected TV from a personal mode into a group mode, some aspects of the voice control (e.g., voice control functionalities requiring complicated or lengthy keywords, such as "go to radio station FM 103.65" or "go to TV, Law and Order, season 1, episode 10") are disabled; while some other aspects of the voice control remain enabled (e.g., voice control functionalities requiring only simple keywords, such as "Radio" and "TV" remain enabled). For another example, when switching a connected TV from a personal mode into a shared mode, some aspects of the motion control (e.g., raising the left arm and stretching the right left leg simultaneously to initiate a search for web content, such as movie trailers on YouTube.com, which are relevant to media content being displayed on the connected TV) are disabled; while some other aspects of the motion control (e.g., a single hand-swiping gesture to signal a switch to next TV channel) remain enabled.

In some implementations, a predefined operating mode is associated with default control settings. For example, control settings shown in FIG. 313 are default settings under the shared mode. In some implementations, default control settings can be overridden by user entered values.

Figure 4:
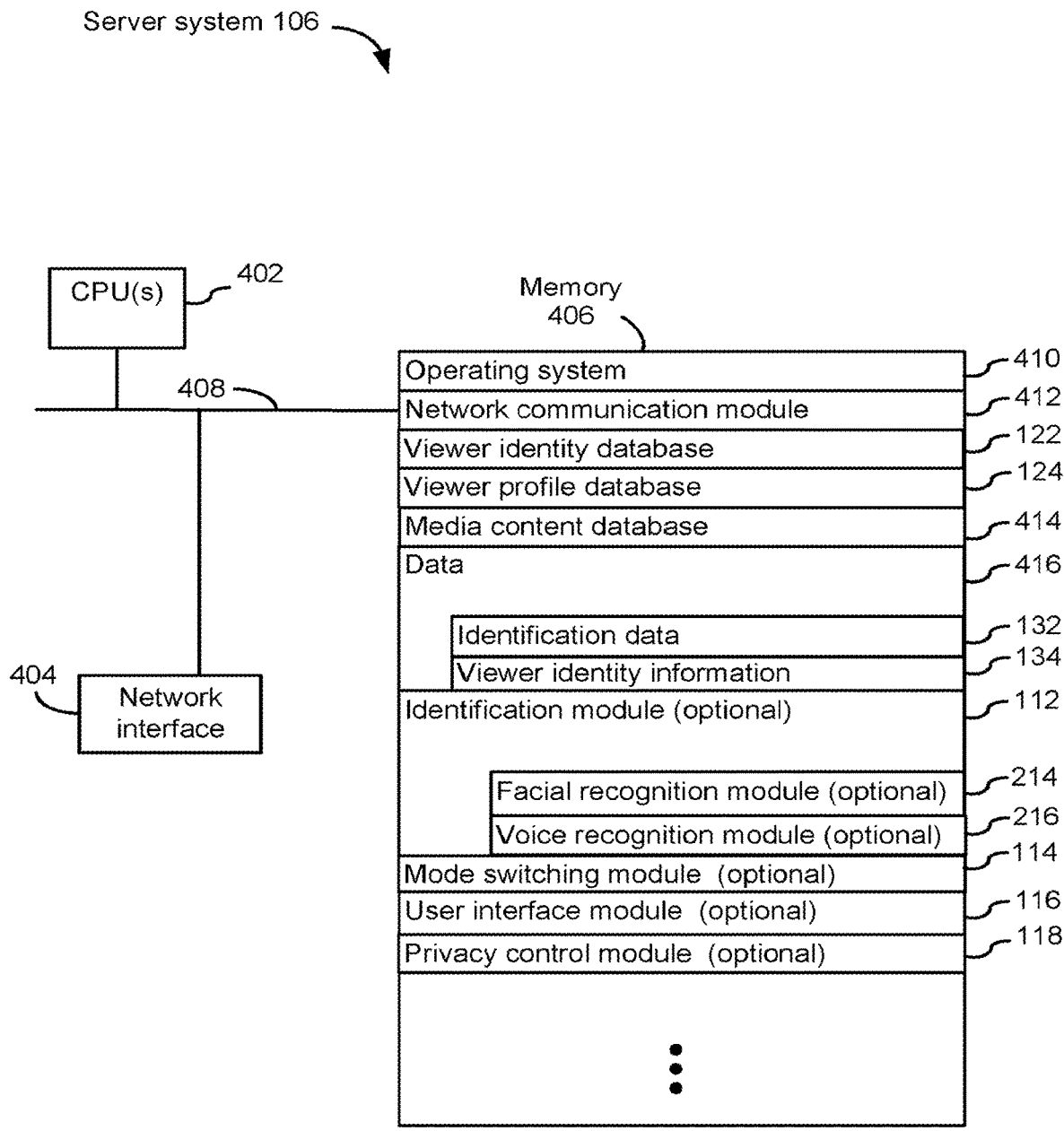
FIG. 4 is a block diagram illustrating a server system, in accordance with some implementations.

FIG. 4 is a block diagram illustrating the server system 106 ("server 106," also called a server), in accordance with some implementations. The server 106 typically includes one or more processing units CPU(s) 402 (also herein referred to as processors), one or more network interfaces 404, memory 406, and one or more communication buses 408 for interconnecting these components. The communication buses 40$ optionally include circuitry (sometimes called a chipset) that interconnects and controls communications between system components. The memory 406 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. The memory 406 optionally includes one or more storage devices remotely located from CPU(s) 402. The memory 406, or alternatively the non-volatile memory device(s) within the memory 406, comprises a non-transitory computer readable storage medium. In some implementations, the memory 406 or alternatively the non-transitory computer readable storage medium stores the following programs, modules and data structures, or a subset thereof:

- an operating system 410, which includes procedures for handling various basic system services and for performing hardware dependent tasks;
- a network communication module (or instructions) 412 for connecting the server 106 with other devices (e.g., the supplemental STB 102) via the one or more network interfaces 404 (wired or wireless), or the communication network 104 (FIG. 1);
- a view identity database 122 for including information relating to viewer identifies (e.g., a viewer's name, or photos);
- a viewer profile database 124 for including one or more viewer profiles e.g., a viewer's favorite movie genres, or a social circle or group with which a viewer is affiliated);
- a media content database 414 for including media content (e.g., photos, songs, YouTube videos, movies or TV episodes) associated with a viewer (e.g., stored on a viewer's smart phone, or uploaded with the viewer's YouTube account);
- data 416 stored on the server 106, which include:
    - identification data 135 for including data relevant to user identities (e.g., facial or voice recognition data); and
    - viewer identity information 137 for including viewer identities (e.g., names), and optionally an existing relationship between two viewers (e.g., viewer 1 is the girlfriend of viewer 2);
- optionally an identification module 112, which includes:
    - a facial recognition module 214 for collecting facial recognition data e.g., generated by the camera 110) of TV viewers; and
    - a voice recognition module 214 for collecting voice recognition data (e.g., generated by a microphone) of TV viewers;
- optionally a mode switching module 114 for placing or maintaining the connected TV in or into a predefined operating mode, based on the total number of viewers present and optionally identifies of these viewers;

optionally a user interface module 116 for displaying different user interface control (displaying or hiding incoming email content) in accordance with a particular operating mode of the connected TV; and optionally a privacy control module 118 for applying different privacy settings to information transferred to (e.g., incoming mails) or stored on (e.g., viewing history) the connected TV, in accordance with a particular operating mode of the connected TV.

In some implementations, one or more of the above identified elements are stored in one or more of the previously mentioned memory devices, and corresponds to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 406 optionally stores a subset of the modules and data structures identified above. Furthermore, the memory 406 optionally stores additional modules and data structures not described above.

Although FIG. 4 shows a "server system 106," also referred to as a server, FIG. 4 is intended more as functional description of the various features which may be present in server system than as a structural schematic of the implementations described herein. In practice, and as recognized by those of ordinary skill in the art, items shown separately could be combined and some items could be separated.

Figure 5:
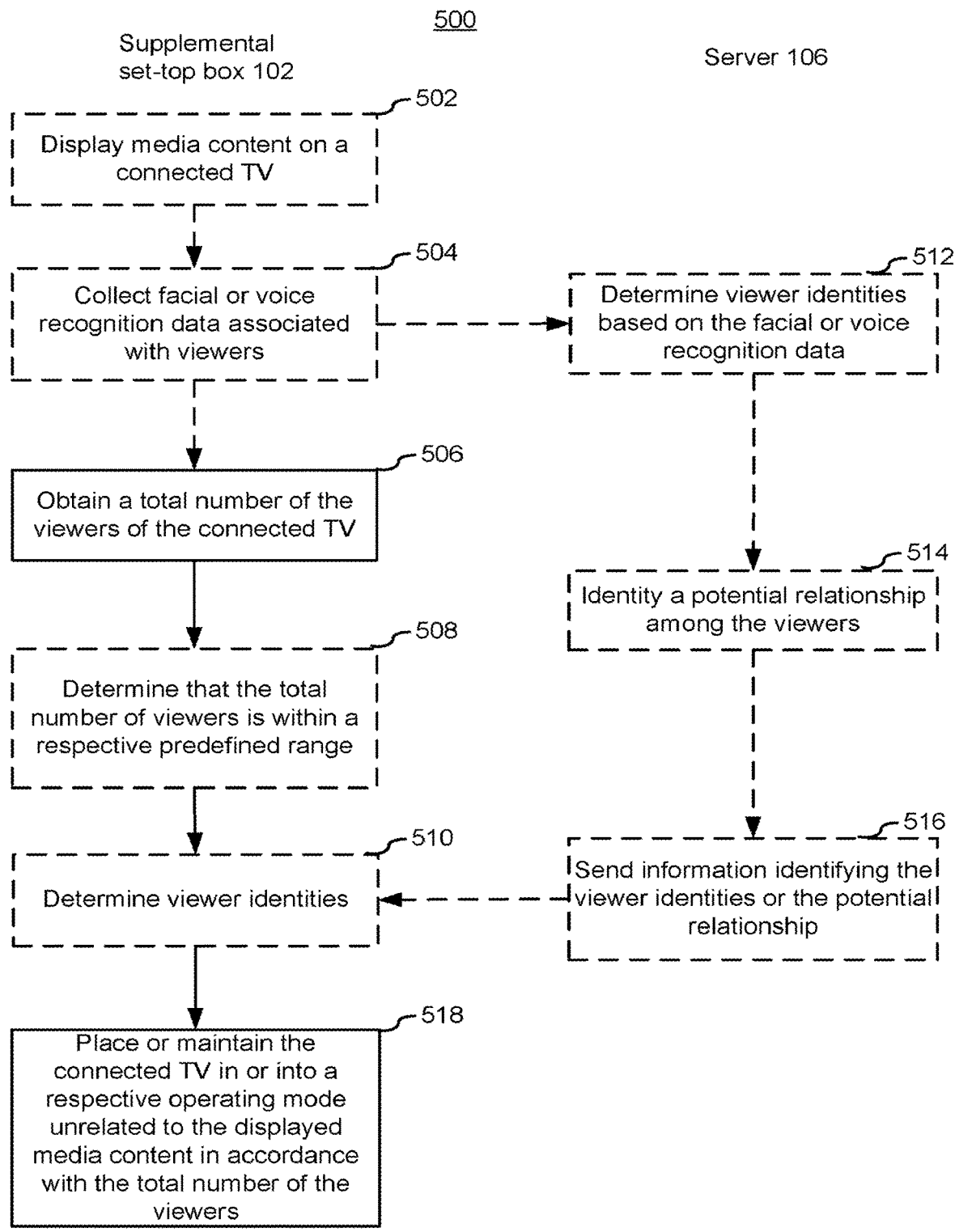
FIG. 5 is a flow chart illustrating a method for changing TV operating mode in accordance with number of viewers present, in a computer system, in accordance with some implementations.

FIG. 5 is a flow chart illustrating a method 500 for changing TV operating mode in accordance with number of viewers present in a computer system, in accordance with some implementations. In some implementations, the method 500 is performed at the supplemental STB 102 (or at the connected TV 132).

In some implementations, the supplemental STB 102 first displays (502) media content (e.g., photos, songs, YouTube videos, movies or TV episodes) on a connected. TV. In some implementations, while still displaying the media content, the supplemental STB 102 collects (504), via the camera 110 or a microphone, facial or voice recognition data associated with one or more viewers who are present. In some implementations, a viewer is considered to be present, if the viewer is within a predefined distance (e.g., less than 7 feet) from the connected TV, or within a predefined angle (e.g., at least 25 degrees) to the connected TV.

In some implementations, after collecting (504) the facial or voice recognition data associated with the viewers, the supplemental STB 102 obtains (506) a total number of viewers of the connected TV. In some implementations, the supplemental STB 102 determines the total number of viewers using the facial or voice recognition data. In other implementations, the supplemental STB 102 obtains the total number of viewers from the server 106.

In some implementations, obtaining (506) the total number of viewers of the connected TV, at the supplemental STB 102 or at the server 106, includes: collecting facial or voice recognition data associated with the viewers using the camera 110 or a microphone, and determining the total number of viewers of the connected TV based on the facial or voice recognition data (e.g., by comparing the facial or voice recognition data with data stored in the view identity database 122). In some implementations, obtaining (506) the total number of viewers of the connected TV includes: collecting information identifying one or more consumer electronic devices associated with the viewers; and determining the total number of viewers of the connected TV based on the information identifying the consumer electronic devices. For example, the supplemental STB 102 analyzes the connection requests 136 (part of the data 218 stored on the supplemental STB 102) stored in a log file or a lookup table, and determines a number of consumer electronic devices (e.g., smart phones or laptops belonged to different viewers) that have connected with the supplemental STB 102, via the local connection 105. In still other implementations, obtaining (506) the total number of viewers of the connected TV includes: collecting a user input indicating the total number of viewers of the connected TV. For example, in some implementations, a user manually enters the total number of viewers, through a menu displayed on the connected TV (e.g. when the camera 110 is not working properly or when a viewer desires to switch off the facial or voice recognition feature).

In some implementations, after determining the total number of viewers of the connected TV, the supplemental STB 102 also identifies a potential relationship among the viewers (e.g., whether the four reviewers who are present have elected to share some or all private information among themselves), or a subset of the viewers (e.g., a similar relationship between two of the four viewers).

In some implementations, after determining the total number of viewers of the connected IV, the supplemental STB 102 also obtains identities associated with the viewers of the connected TV. In some implementations, the supplemental STB 102 obtains viewer identities by: (i) collecting facial or voice recognition data associated with the viewers (e.g., collecting a photo of a viewer's face, or an audio clip of a viewer's voice), and comparing the collected facial or voice recognition data with a user identity database (e.g., the viewer identity debase 122); or (ii) collecting information identifying one or more consumer electronic devices (e.g., device ID, a smart phone's SIM card number, or a MAC address of a laptop or desktop computer) associated with the viewers, and comparing the collected information with a device database (e.g., a database including information that identifies a device, a smart phone or a laptop, as belonged to a particular viewer).

In some implementations, the supplemental STB 102 then places or maintains the connected TV in or into a respective operating mode of the plurality of operating modes, in accordance with the total number of viewers and the viewer identities. For example, when the supplemental STB 102 identifies that there are two viewers present, Tom and Jerry, both of whom have shared all private information with each other (temporarily or permanent), the supplemental STB 102 places or maintains the connected TV in the personal mode (as opposed to the shared mode), so that a text message Toni receives on his smart phone would be displayed on the connected TV (e.g., accessible to Jerry).

In some implementations, where two or more viewers (e.g., a first viewer A and a second viewer B) are present, the supplemental STB 102 first determines identity of the first viewer A, and then determines identity of the second viewer B. In some implementations, the supplemental STB 102 further determines a potential relationship between the first and second viewers based on the identities of the first and second viewers—e.g., whether the viewer A is a family member of the viewer B, whether the viewer A shares a same social circle with the viewer B, or whether the viewer A has shared all his or her private information (e.g., emails) or private media content (e.g., YouTube video) with the viewer B—and placing or maintaining the connected TV in or into a respective operating mode of the plurality of operating modes, in accordance with the potential relationship. These approaches are beneficial because they renders privacy settings associated with a particular operating mode flexible: default privacy settings can be overridden without human intervention, temporarily or permanently, based on user identities or based on a potential relationship between two viewers. For example, if the viewer A has always forward his or her incoming emails and text messages to the viewers B, the supplemental STB 102, in some implementations, places the connected TV in the personal mode (as opposed to the shared mode) even when both the viewer A and the viewer B are present.

Alternatively, in other implementations, the supplemental STB 102 obtains the total number of viewers from the server 106. In other implementations, the supplemental STB 102 transmits the facial or voice recognition data collected to the server 106. In some implementations, the server 106 then determines the total number of viewers who are present, in accordance with the facial or voice recognition data received from the supplemental STB 102.

In some implementations, in addition to determining the total number of viewers, the server 106 also determines (512) viewer identities based on the facial or voice recognition data. In some implementations, the server 106 determines (512) viewer identities by comparing the facial or voice recognition data received from the supplemental STB 102 with data stored in the viewer identity database 122. In some implementations, after having determined viewer identities, the server 106 identifies (514) a potential relationship among the viewers or a subset of the viewers (e.g., whether the viewers who are present have shared some or all their private information among each other). In some implementations, the server 106 then sends (516) information identifying the viewer identities and optionally the identified relationship, to the supplemental STB 102, for further processing.

In some implementations, after obtaining (506) the total number of viewers present, the supplemental STB 102 determines (508) whether the total number of viewers is within a predefined range (e.g., 1, 2-3, or 4 or more).

In some implementations, based on the viewer identity information 137, the supplemental STB 102 further determines (510) or ascertains identities of the viewers who are present. For example, using the viewer identities information 137 received from the server 106, the supplemental STB 102 determines the viewer directly sitting in front of the connected TV is Andy, the viewer standing at roughly 30 degrees to the TV is Doug, and the viewer sitting on a sofa but facing away from the TV is Gilbert.

In some implementations, in accordance with the total number of viewers present, the supplemental STB 102 then places or maintains (518) the connected in or into a respective operating mode. For example, when the total number of viewers is 2 (e.g., both viewer A and viewer B are present), the supplemental STB 102 places or maintains the connected TV in the shared mode, and as a result, and incoming instant messages addressed to the viewer A are not displayed on the connected TV.

In some implementations, in accordance with the total number of viewers present and optionally the viewer identities, the supplemental STB 102 places or maintains (518) the connected in or into a respective operating mode. For example, when the total number of viewers is 2 (e.g., both viewer A and viewer B are present), and the viewer A is viewer B's 10-month old baby son (who cannot yet read), the supplemental STB 102 places or maintains the connected TV in the personal mode (as opposed to the shared mode), and as a result, incoming chat messages for the viewer B are displayed on the connected TV even though the viewer A is also present.

In some implementations, after placing or maintaining (518) the connected in or into a respective operating mode, the supplemental STB 102 identifies a particular individual (e.g., an individual who should be but is not yet present) based on the information identifying the one or more viewers (e.g., a Gmail invite to watch a movie together, which has been accepted not only by the viewers who are present but also by the individual who is not yet present), and sends a reminder to the particular individual of an event associated with the one or more viewers (e.g., sending a Gmail reminder to individual(s) who are not yet present, remaindering them that the movie is about to begin at a specific time).

Figure 6:
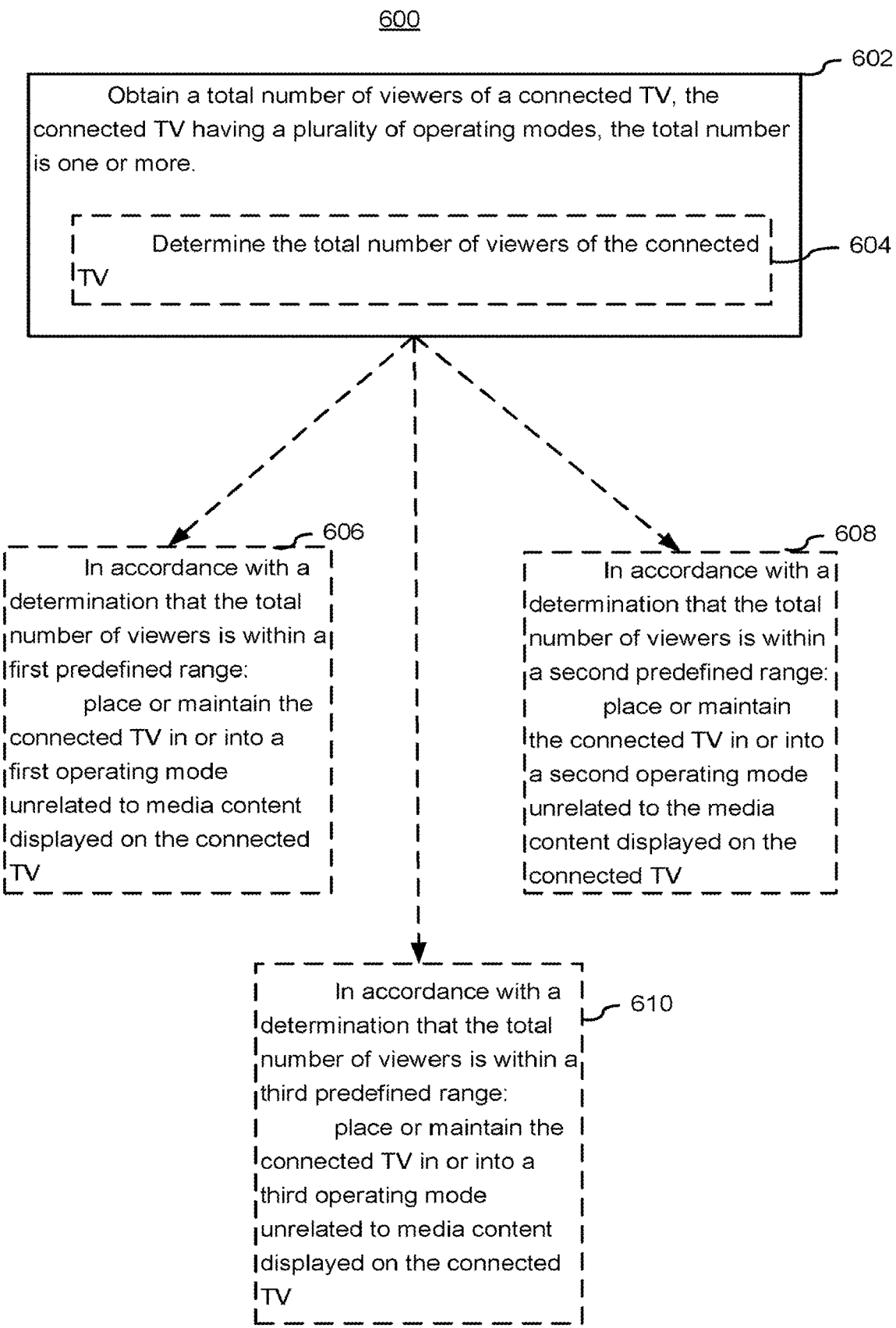
FIG. 6 is a flow chart illustrating a method for changing TV operating mode in accordance with number of viewers present, at a supplemental set-top box, in accordance with some implementations.

FIG. 6 is a flow chart illustrating a method 600 for changing TV operating mode in accordance with number of viewers present, at a supplemental STB, in accordance with some implementations. In some implementations, the method 600 is performed at the supplemental STB 102 or at the connected TV 132.

In some implementations, the supplemental STB 102 obtains (602) a total number of viewers of a connected TV, which has a plurality of operating modes (e.g., including a personal mode, a share mode, and a party mode). In some implementations, the total number is one (e.g., a single viewer is present). In some implementations, the total number is two to three inclusive, or four or more.

In some implementations, where the supplemental STB 102 is equipped with appropriate processing power, the supplemental STB 102 determines (604) the total the total number of viewers (e.g., using the identification module 112). In other implementations, where processing at a server is desired, the supplemental STB 102 obtains (602) the total the total number of viewers from the server 106, which determines the total number of viewers based on the facial (or voice) recognition data received from the supplemental STB 102.

In some implementations, in accordance with the total number of viewers, the supplemental STB 102 then places or maintains the connected TV in or into a respective operating mode of a plurality of predefined operating modes. In some implementations, the plurality of predefined ranges includes: a predefined range (e.g., 1) for one viewer, a predefined range (e.g., 2-3, inclusive) for a small group of viewers, and a predefined range (e.g., 4 or more) for a large group of viewers.

In some implementations, the operating modes are unrelated to (or independent from) media content displayed on the connected TV (e.g., changing operating mode of the connected TV does not necessarily change the media content on the TV). For example, while viewer A is watching a Law and Order episode on her Google TV in her living room, viewer B enters living room and sits down next to the viewer A. After detecting that the total number of viewers is now two (both the viewer A and the viewer B are now present), the supplemental STB 102—without interrupting the Law and Order episode being displayed on the Google TV—switches the connected TV into the shared mode (from the personal mode). This approach, changing operating mode of the connected TV without changing the media content displayed thereon, is beneficial, because it enhances viewing experience (e.g., by not interrupting the display of the media content) and protects user privacy (e.g., the viewer B is less likely to notice the operating mode of the TV has changed because the media content displayed on the TV was not interrupted).

In some implementations, in accordance with a determination that the total number of viewers, is within a first predefined range of a plurality of predefined ranges (e.g., 1, or 2-3 inclusive), the supplemental STB 102 places or maintains (606) the connected TV in or into a first operating mode (e.g., the personal mode or the shared mode, respectively) unrelated to media content being displayed on the connected TV (e.g., without interrupting a Law and Order episode being watched by the viewer A). In some implementations, an operating mode of the connected TV being unrelated to the media content being displayed on the TV means that a change in the TV's operating mode does not necessarily change or interrupt the media content being display on the TV, and because there being no change or interruption in the media content, some viewers are sometimes not aware of an operating mode change.

For example, while viewer A is, in her living room, watching a South Park episode on a connected TV that in the personal mode, viewer B, an acquaintance of the viewer A, steps into the living room; after detecting the presence of viewer B, the connected TV switches into the shared mode (from the personal mode) without causing any interruption to the South Park episode being displaying on the TV (e.g., by displaying a conspicuous—large or persistent—on-screen reminder that a mode switch is taking or has taken place). These features are useful, because they avoid any potential embarrassments to viewers who do not want other viewers to know that a change in operating mode of the connected TV is taking place, because in some situations, a viewer may be embarrassed by, upon the arrival or appearance or another person, having to scramble to turn off the display of her personal information on a TV, a sign that may be interpreted, albeit erroneously or mistakenly, as attempting to hide something from the other person (such as, an acquaintance, a friend or a family member).

In some implementations, in accordance with a determination that the total number of viewers is within a second predefined range (e.g., 2-3 inclusive, or 4 or more) of the plurality of predefined ranges, the supplemental STB 102 places or maintains (608) the connected TV in or into a second operating mode (the shared mode or the party mode, respectively) unrelated to the media content. In some implementations, the second operating mode is different from the first operating mode.

In some implementations, in accordance with a determination that the total number of viewers is within a third predefined range (e.g., 4 or more, or 1) of the plurality of predefined ranges, the supplemental STB 102 places or maintains (610) the connected TV in or into a third operating mode (the party mode or the personal mode, respectively) unrelated to the media content. In some implementations, the third operating mode is different from the first and second operating modes.

For example, in some implementations, the supplemental STB 102 places or maintains the connected TV in or into the personal mode when the total number of viewers is 1; in some implementations, the supplemental STB 102 places or maintains the connected TV in or into the shared mode when the total number of viewers is 2 to 3; and in some implementations, the supplemental STB 102 places or maintains the connected TV in or into the party mode when the total number of viewers is 4 or more.

In some implementations, a respective operating mode of the plurality of operating modes is associated with different privacy settings. For example, in some implementations, privacy settings associated with the personal mode of the connected TV (e.g., in FIG. 2A, in the category "Call history," the setting "Display on TV=Yes") are different from those associated with the shared mode (e.g., in FIG. 2B, in the category "Call history," the setting "Display on TV=No").

In some implementations, in the personal mode, personal information received from an external source can be displayed on the connected TV (e.g., incoming emails received on a smart phone can be displayed on the TV). In some implementations, in the shared mode, personal information received from an external source may not be displayed on the connected TV (e.g., incoming emails received on a smart phone may not be displayed or are hidden from display on the TV). In some implementations, in the group mode, personal information received from an external source may not be displayed on the connected TV (e.g., incoming emails received on a smart phone is not displayed or is hidden from display on the TV), and media content appropriate for a large group of viewers (e.g., a party video or a hip-hop music TV) is displayed on the connected TV.

In some implementations, personal or private information associated with a view is one of incoming or outgoing phone calls, text messages, instant messages, emails, or histories thereof (messaging history, call history, or email history). In some implementations, the media content appropriate for a large group of viewers is one of: a photo slideshow, an audio and video streaming, or a party game.

In some implementations, the media content appropriate for a large group of viewers includes media content associated with a group of viewers. For example, in some implementations, the media content appropriate for a large group of viewers includes media content "liked" (or considered as favorite) by more than a predefined number of viewers in a same social circle (e.g., a G+ circle). In other implementations, the media content appropriate for a large group of viewers includes public media content associated with an individual viewer (e.g., this is indicated by the "Display on TV=Yes" setting 266 in FIG. 2C). For example, in some implementations, the media content appropriate for a large group of viewers includes: media content offered for share by a viewer with other viewers (e.g., a YouTube video sent to other viewers using a recommendation function), or media content made public by a viewer (e.g., a viewer's public photo albums on Google Picasa). In some implementations, the media content appropriate for a large group of viewers does not include (or excludes): private media content associated with a viewer. For example, in some implementations, the media content appropriate for a large group of viewers does not include or excludes a viewer's private photo albums on Google Picasa, or YouTube video a viewers has uploaded to the interact but kept as private (e.g., this is indicated by the "Display on TV=No" setting 268 in FIG. 2C).

In some implementations, a respective operating mode of the plurality of operating modes is associated with different control settings. For example, in some implementations, control settings associated with the personal mode of the connected TV (e.g., in FIG. 3A, in the category "Motion control," the setting "Control enabled=Yes") are different from those associated with the shared mode (e.g., in FIG. 3B, in the category "Motion control," the setting "Control enabled=No").

In some implementations, in the personal mode, voice or motion control of the connected TV is enabled. For example, when a viewer is alone by himself or herself, the viewer can control the connected TV (e.g., turning the TV on/off, switching to a different channel, or turning volume up/down) and one or more devices connected thereto (e.g., a DVD player, a BlueRay player, a sound system, a WII device, a SONY PLAY STATION, or a VCD player) using voice commands or gestures. This approach is advantageous, because it affords a viewer more flexibility in controlling the connected TV. For example, when a viewer is watching the TV while talking to a customer service agent on a cell phone, and is thus unable to control the TV by voice (e.g., by voice commands), the viewer can use motions or gestures to control the TV, e.g., by moving her right hand from the right to the left or mimicking a page-turning gesture, to effect a switch to the immediate next channel.

In some implementations, in the group mode (e.g., when 4 or more viewers are present), voice or motion control of the connected TV is not enabled (e.g., disabled). For example, when a viewer is watching an NFL game together with her extended family (e.g., including 5 or more relatives), neither the viewer nor the relatives can control the connected TV by voice (e.g., by speaking the phrase "turn up the volume") or by motion (e.g., by raising a left hand up above the head, to increase the volume). This approach is advantageous, because in situations where a number of viewers are present, voice or motion (e.g., gesture) overlaps may be rampant, which may result in confusion at the supplemental STB (e.g., as to what viewer intentions are) and consequently a non-optimal viewing experience.

For example, viewer A, attempting to increase volume of a connected TV, utters the phrase "volume UP," which the supplemental STB interprets as a user (voice) command to turn the volume up on the TV; at or around the same time, however, viewer B, feeling an arm pain, begins to move quickly his right arm up and down, which the supplemental STB interprets as a user (gesture) command to turn the volume down on the TV. Having received both commands, in some cases, the STB might not effect a volume change (e.g., when the receipt of two conflicting commands results in the cancellation of both commands); while in other cases, the supplemental STB might first increase the TV volume (e.g., in response to voice control by the viewer A), but then immediately decrease the TV volume (e.g., in response to the arm motion gesture by the viewer B). Neither response by the supplemental STB (e.g., no action, or turning the volume up then down) is desired, these such controls are disabled.

In some implementations, voice or motion (e.g., gesture) control of the connected TV is transferred or maintained, based on viewer identity. In some implementations, a particular individual, among a plurality of individuals, is first identified, based on the information identifying the one or more viewers. In some implementations, control of the connected TV is transferred or maintained in accordance with the identification of the particular individual.

For example, when 3 viewers (viewers A, B, and C) are present at a living room of an apartment, the supplemental STB identifies (using a camera and facial recognition techniques) that viewer A is the owner of the apartment, and that viewers B and C are guests. In accordance with these identification, when conflicting commends are receiving (e.g., the viewer A would like to switch to the Fox News channel, while the viewer B would like to switch to the MSNBC channel), the supplemental STB takes action in accordance with the control by the viewer A (e.g., switching to the Fox News channel), and disregards the (attempted) control by the viewer B.

For another example, when a 7-person family (viewers A, B, C . . . , and G) is present in their living room watching an NFL game, after identifying (using the camera, and facial recognition techniques) that viewers A and B are the parents of viewers C . . . , and G, the supplemental STB allows control of the connected TV be transferred automatically between the viewers A and B, but would not transfer the control of the TV to other viewers (e.g., the viewer C, the eldest children), unless specifically requested (e.g., by the viewer A or B).

This approach is advantageous, because it restricts control to the connected TV to a relatively small number of viewers, thereby minimizing the occurrences of conflicting commands and confusion resulting there from; and because it enables features similar to parental control.

Figure 7:
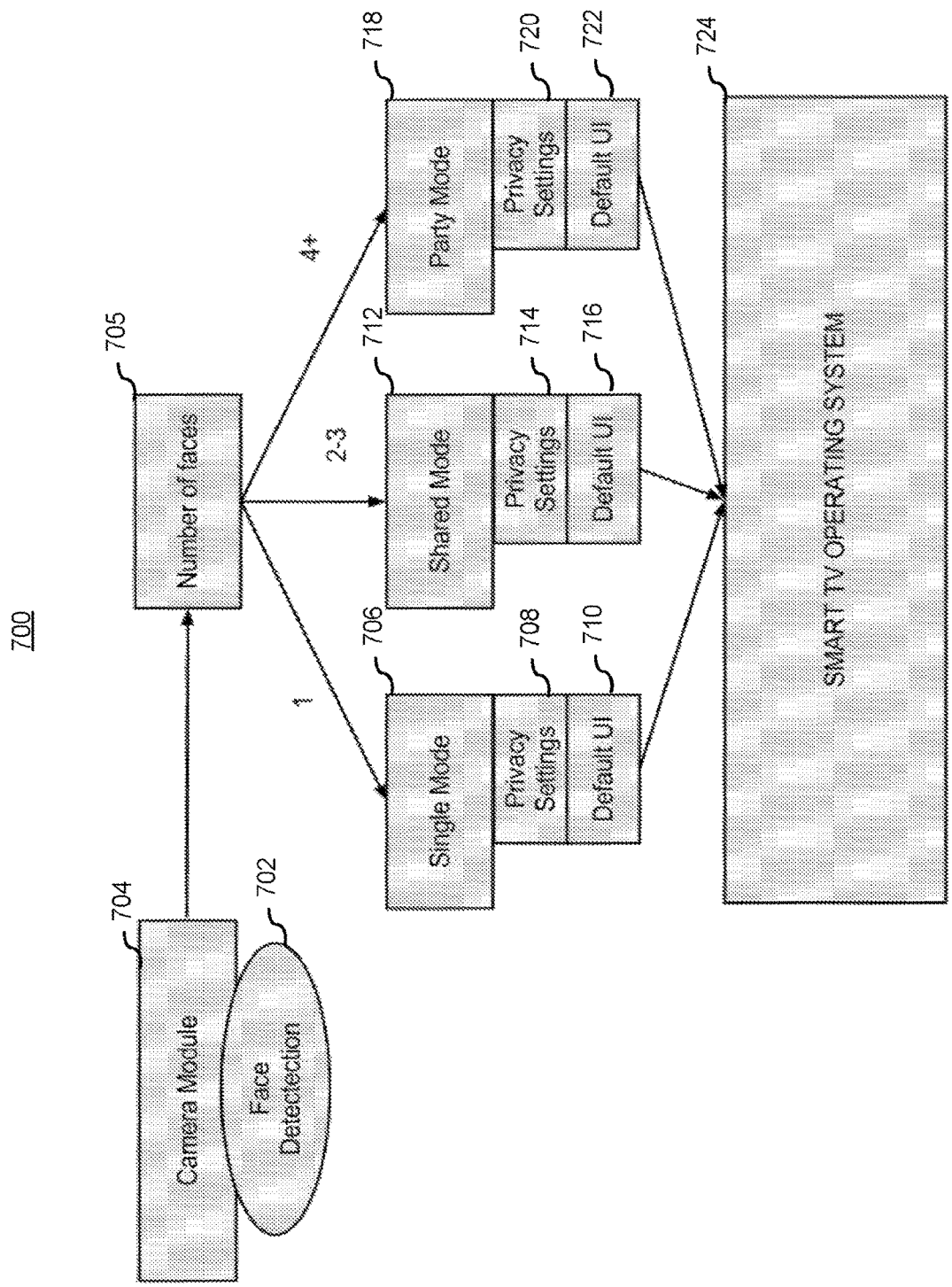
FIG. 7 is a block diagram illustrating an example functional diagram illustrating operations or modules used in a supplemental STB that are configured to change operating modes of a TV based on the number of viewers present, in accordance with some implementations.

FIG. 7 is a block diagram illustrating an example functional diagram illustrating operations or modules used in a supplemental STB that are configured to change operating modes of a TV based on the number of viewers present, in accordance with some implementations.

As shown in FIG. 7, in some implementations, the supplemental STB 102 includes a smart TV operating system 724 (e.g., a Google TV operating system), which executes the method 500 or 600 described above, in full or in part. In some implementations, the supplemental STB 102 includes a camera module 704, which in turn includes a face detection module 702. In some implementations, the supplemental STB 102 uses facial detection data generated by the camera module 704 to obtain a total number of viewers who are present (e.g., a number of faces 705). In some implementations, the supplemental STB 102 places or maintains a connected TV into one of several operating modes, in accordance with the total number of viewers who are present.

In some implementations, in accordance with a determination that the total number of viewer(s) is 1, the supplemental STB 102 places or maintains the connected TV into or in a single mode (e.g., the personal mode) 706. In some implementations, when the connected TV is in the single (or personal) mode 706, the supplemental STB 102 applies privacy settings 708 (e.g., settings 252-262 in FIG. 2A) associated with the single mode to private information received at the connected TV from an external device (e.g., incoming emails received from a smart phone are displayed on the connected TV).

In some implementations, when connected with two or more electronic devices 102 (e.g., smart phones), the supplemental STB 102 processes control commands received from multiple electronic devices 102 (e.g., smart phones), e.g., on a first come first server basis or a priority basis. In some implementations, when in the party mode, the supplemental STB 102 allows connection to a single electronic device 102, to reduce security risk (e.g., to avoid security breach to the supplemental STB 102 or to a personal computer within the same local area network).

In some implementations, when the connected TV is located in a public area (e.g., at a supermarket, at an air port, at a public library, or inside an air plane), the supplemental STB 102 restricts connection to predefined electronic devices 102 (e.g., a testing device being used by a maintenance worker, or a remote control device with appropriate security credentials), in according with a device identifier, so as to provide enhanced security or access control as to which users or what devices can connect to and play media content on the connected TV. In some implementations, the device identifier is a MAC address e.g., for a computer), an IMEI number (e.g., for a cell phone), or a user name or login.

In some implementations, when the connected TV is in the single mode (e.g., the personal mode) 706, the supplemental STB 102 configures or formats a default user interface 710 for display on the connected TV. For example, the default user interface 710, in the single (or personal) mode, includes menus for accessing recent viewing history or call history on the connected TV.

In some implementations, in accordance with a determination that the total number of viewers is 2 to 3 inclusive, the supplemental STB 102 places or maintains the connected TV into or in a shared mode 712. In some implementations, when the connected TV is in the shared mode 712, the supplemental STB 102 applies privacy settings 714 (e.g., settings 252-262 in FIG. 2B) associated with the shared mode to private information received at the connected TV from an external device (e.g., incoming emails received from a smart phone are not displayed on the connected TV). In some implementations, when the connected TV is in the shared mode 712, the supplemental STB 102 configures or formats a second default user interface 716 for display on the connected TV. For example, the second default user interface 716, in the shared mode, does not include (or include non-actionable or grayed-out) menus for accessing recent viewing history or call history on the connected TV.

In some implementations, in accordance with a determination that the total number of viewers is 4 or more, the supplemental STB 102 places or maintains the connected TV into or in a party mode 718. In some implementations, when the connected TV is in party mode 718, the supplemental STB 102 applies privacy settings 720 (e.g., settings 252-262 and 266-268 in FIG. 2C) associated with the party mode to private information received at the connected TV from an external device (e.g., incoming emails received from a smart phone are displayed on the connected TV). In some implementations, when the connected TV is in the party mode 718, the supplemental STB 102 configures or formats a third default user interface 722 for display on the connected TV. For example, the third default user interface 722, in the party mode, does not include (or include non-actionable or grayed-out) menus for accessing recent viewing history or call history on the connected TV, but includes menus (e.g., a media player or a multi-player game) for displaying media content appropriate for a large group of viewers on the connected TV.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first predefined range could be termed a second predefined range, and, similarly, a second predefined range could be termed a first predefined range, which changing the meaning of the description, so long as all occurrences of the "first predefined range" are renamed consistently and all occurrences of the "second predefined range" are renamed consistently. The first predefined range, and the second predefined range are both predefined ranges, but they are not the same predefined range.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:
1. A method comprising:
   determining, using a hardware processor, that a first electronic device is located in proximity to a media device that presents media content, wherein the media device receives personal information from a second electronic device, and wherein the media device has a plurality of operating modes that includes (i) a first operating mode in which the personal information from the second electronic device can be presented on the media device and (ii) a second operating mode in which the personal information from the second electronic device is inhibited from being presented on the media device; and automatically placing, using the hardware processor, the media device in the first operating mode or the second operating mode based on the first electronic device that is located in proximity to the media device, wherein the media device is placed in the first operating mode in which the personal information from the second electronic device can be presented on the media device in response to determining that the first electronic device is within a first predefined range and wherein the media device is placed in the second operating mode in which the personal information from the second electronic device is inhibited from being presented on the media device in response to determining that the first electronic device is within a second predefined range.

2. The method of claim 1, further comprising determining an identity of a first person located in proximity to the media device, wherein the media device is placed in one of the plurality of operating modes based on the identity of the first person located in proximity to the media device.

3. The method of claim 1, wherein each of the plurality of operating modes is associated with privacy settings.

4. The method of claim 1, wherein each of the plurality of operating modes is associated with control settings.

5. The method of claim 1, further comprising collecting facial or voice recognition data associated with people located in proximity to the media device and determining a number of people located in proximity to the media device based on the facial or voice recognition data.

6. The method of claim 1, further comprising collecting information identifying electronic devices associated with people located in proximity to the media device and determining a number of people located in proximity to the media device based on the information identifying the electronic devices.

7. The method of claim 1, further comprising:
identifying a particular individual, among a plurality of individuals, based on the information identifying one or more people located in proximity to the media device; and
transferring control of the media device in accordance with the identifying the particular individual.

8. The method of claim 1, further comprising:
identifying a particular individual based on the information identifying one or more people located in proximity to the media device; and
sending a reminder to the particular individual of an event associated with the one or more people located in proximity to the media device.

9. The method of claim 1, wherein the media device is paired with the first electronic device that is external to the media device, wherein the personal information is received from the first electronic device for presenting on the media device in the first operating mode, and wherein the personal information is received from the first electronic device and is inhibited from being presented on the media device in the second operating mode.

10. The method of claim 2, further comprising:
determining an identity of a second person located in proximity to the media device;
determining a potential relationship between the first person and the second person based on the identity of the first person and the identity of second person; and
placing the media device in a respective operating mode of the plurality of operating modes based on the potential relationship.

11. A system comprising:
a hardware processor that:
determines that a first electronic device is located in proximity to a media device that presents media content, wherein the media device receives personal information from a second electronic device, and wherein the media device has a plurality of operating modes that includes (i) a first operating mode in which the personal information from the second electronic device can be presented on the media device and (ii) a second operating mode in which the personal information from the second electronic device is inhibited from being presented on the media device; and
automatically places the media device in the first operating mode or the second operating mode based on the first electronic device that is located in proximity to the media device, wherein the media device is placed in the first operating mode in which the personal information from the second electronic device can be presented on the media device in response to determining that the first electronic device is within a first predefined range and wherein the media device is placed in the second operating mode in which the personal information from the second electronic device is inhibited from being presented on the media device in response to determining that the first electronic device is within a second predefined range.

12. The system of claim 11, wherein the hardware processor further determines an identity of a first person located in proximity to the media device, wherein the media device is placed in one of the plurality of operating modes based on the identity of the first person located in proximity to the media device.

13. The system of claim 11, wherein each of the plurality of operating modes is associated with privacy settings.

14. The system of claim 11, wherein each of the plurality of operating modes is associated with control settings.

15. The system of claim 11, wherein the hardware processor further collects facial or voice recognition data associated with people located in proximity to the media device and determines a number of people located in proximity to the media device based on the facial or voice recognition data.

16. The system of claim 11, wherein the hardware processor further collects information identifying electronic devices associated with people located in proximity to the media device and determining a number of people located in proximity to the media device based on the information identifying the electronic devices.

17. The system of claim 11, wherein the hardware processor further:
identifies a particular individual, among a plurality of individuals, based on the information identifying one or more people located in proximity to the media device; and
transfers control of the media device in accordance with the identifying the particular individual.

18. The system of claim 11, wherein the hardware processor further:
identities a particular individual based on the information identifying one or more people located in proximity to the media device; and sends a reminder to the particular individual of an event associated with the one or more people located in proximity to the media device.

19. The system of claim 11, wherein the media device is paired with the first electronic device that is external to the media device, wherein the personal information is received from the first electronic device for presenting on the media device in the first operating mode, and wherein the personal information is received from the first electronic device and is inhibited from being presented on the media device in the second operating mode.

20. The system of claim 12, wherein the hardware processor further:

determines an identity of a second person located in proximity to the media device;

determines a potential relationship between the first person and the second person based on the identity of the first person and the identity of the second person; and places the media device in a respective operating mode of the plurality of operating modes based on the potential relationship.

21. A non-transitory computer-readable medium containing computer executable instructions that, when executed by a processor of a computing device, cause the processor to perform a method, the method comprising:

determining that a first electronic device is located in proximity to a media device that presents media content, wherein the media device receives personal information from a second electronic device, and wherein the media device has a plurality of operating modes that includes (i) a first operating mode in which the personal information from the second electronic device can be presented on the media device and (ii) a second operating mode in which the personal information from the second electronic device is inhibited from being presented on the media device; and automatically placing the media device in the first operating mode or the second operating mode based on the first electronic device that is located in proximity to the media device, wherein the media device is placed in the first operating mode in which the personal information from the second electronic device can be presented on the media device in response to determining that the first electronic device is within a first predefined range and wherein the media device is placed in the second operating mode in which the personal information from the second electronic device is inhibited from being presented on the media device in response to determining that the first electronic device is within a second predefined range.

* * * * *